United States Patent [19]
Briese

[11] Patent Number: 5,841,146
[45] Date of Patent: Nov. 24, 1998

[54] REFLECTOR

[76] Inventor: Hans-Werner Briese, Johannkamp 3, D-22459 Hamburg, Germany

[21] Appl. No.: 838,088

[22] Filed: Apr. 15, 1997

[30] Foreign Application Priority Data

May 8, 1996 [DE] Germany .................. 196 18 434.9

[51] Int. Cl.⁶ .................................................. G03B 15/02
[52] U.S. Cl. ........................................... 250/493.1; 362/16
[58] Field of Search .............................. 250/493.1, 494.1, 250/495.1, 503.1, 504.12; 360/7, 11, 16, 17, 18, 319, 320, 341, 343, 346, 347, 352

[56] References Cited

U.S. PATENT DOCUMENTS

| | | |
|---|---|---|
| 923,542 | 6/1909 | Losey . |
| 1,683,270 | 9/1928 | Taylor et al. . |
| 2,205,860 | 6/1940 | Olds ......................................... 240/1.3 |
| 2,806,134 | 9/1957 | Tarcici .................................... 240/103 |
| 3,275,815 | 9/1966 | Golaz et al. ............................ 240/6.42 |
| 3,294,962 | 12/1966 | Hilzen et al. ............................. 240/1.3 |
| 3,781,535 | 12/1973 | Larson ..................................... 240/1.3 |
| 3,851,164 | 11/1974 | Intrator .................................... 240/1.3 |
| 3,873,821 | 3/1975 | Larson ........................................ 240/1 |
| 3,970,835 | 7/1976 | Crete ......................................... 362/11 |
| 4,078,170 | 3/1978 | Sloop ...................................... 362/322 |
| 4,187,531 | 2/1980 | Lowell et al. ............................. 362/17 |
| 4,524,405 | 6/1985 | Heard ....................................... 362/18 |
| 4,633,374 | 12/1986 | Waltz et al. .............................. 362/17 |
| 4,777,566 | 10/1988 | Lowell et al. ............................. 362/18 |
| 5,023,757 | 6/1991 | Shirilla ..................................... 362/16 |
| 5,584,564 | 12/1996 | Phyle ....................................... 362/102 |

FOREIGN PATENT DOCUMENTS

| | | |
|---|---|---|
| 659 168 | 4/1938 | Germany . |
| 762540 | 12/1952 | Germany . |
| GM 16 97 929 | 3/1955 | Germany . |
| GM 17 64 734 | 4/1958 | Germany . |
| GM 19 53 300 | 1/1967 | Germany . |
| OS 22 03 786 | 8/1973 | Germany . |
| 77 38 682 U1 | 5/1978 | Germany . |
| 31 24 757 A1 | 2/1983 | Germany . |
| 83 02 671.1 U1 | 6/1983 | Germany . |
| 645 735 | 10/1984 | Switzerland . |

*Primary Examiner*—Kiet T. Nguyen
*Attorney, Agent, or Firm*—Vidas, Arrett & Steinkraus, P.A.

[57] ABSTRACT

An umbrella Reflector comprising a bearing body into which a tubular carrying element is inserted so that it is displaceably held within the bearing body, a ring of articulated joints arranged on the bearing body by elements of which articulated joints umbrella stretchers are hinged on said bearing body to which umbrella stretchers a reflecting umbrella covering is fastened, a sliding element being displaceable on the tubular carrying element on which sliding means a ring of toggle joints is arranged to which expanding stretchers are mounted, the end of which expanding stretchers pointing to the umbrella covering and including articulated expanding joints is secured to the umbrella stretchers, the expanding stretchers being dimensioned so that for opening the reflector the sliding element, contrary to the restoring forces becoming effective during expansion of the umbrella stretchers, is displaceable approximately up to the plane of said articulated expanding joints or beyond bearing body into an open position providing an arrestment, and an element emitting electromagnetic or acoustic waves which is arranged at the end of the tubular carrying element facing the interior of the umbrella-type reflector so that by displacing the tubular carrying element within the bearing body element can be moved into different positions in relation to the opened reflector.

18 Claims, 1 Drawing Sheet

REFLECTOR

BACKGROUND OF THE INVENTION

The invention relates to a reflector for light waves, electromagnetic waves, acoustic waves, etc. adapted to be opened like an umbrella. In particular, the reflector may serve lighting purposes in photography and film, the transmission and reception of radio waves, the collection of solar energy as well as the transmission and reception of sound.

In the before-mentioned fields of application there is a demand for mobile reflectors which can be folded for transport purposes and opened to their full size at the place of use.

From the German Patent Application DE 31 24 757 A1 a flashbulb arrangement is known which comprises an umbrella-type folding reflector. In the case of this arrangement umbrella stretchers are mounted on a lamp socket carrying means. Said umbrella stretchers are supported by a guide ring by means of expanding stretchers. The guide ring is guided on the tubular lamp socket. The folding reflector can be folded or opened by displacing the guide ring on the lamp socket. In the open position the guide ring engages an arresting means provided on the lamp socket. Cylindrical sockets of different lengths may be provided between the arresting means and the lamp body for the adaptation to folding reflectors of different sizes. With this arrangement the lamp is always rigidly arranged with respect to the reflector. Besides, the umbrella-type stretcher configuration does not allow small focal lengths to be obtained. Large-sized folding reflectors of this construction principle can hardly be opened. The arresting means then needs to support high restoring forces. This is also the case if, for the purpose of an approach to an ideal reflector shape, a fine segmentation is intended to be achieved by means of many stretchers.

SUMMARY OF THE INVENTION

It is the object of the invention to provide a constructively simple umbrella-type reflector where the element to be focussed is displaceable in relation to the reflector so that small focal lengths can be obtained as well.

This problem is resolved by a reflector characterized by the features specified in claim 1. Advantageous developments of the reflector are mentioned in the subclaims.

The inventive reflector comprises a tubular carrying means which at the one end includes the element to be focussed—a lamp, for instance. Furthermore, it comprises a bearing body which, like the top of an umbrella, includes a ring of articulated joints. However, contrary to any known umbrella constructions, the tubular carrying means is not fixedly but axially displaceable held within the bearing body. To the articulated joints of the bearing body umbrella stretchers are mounted which comprise articulated expanding joints spaced apart from their bearing body hinge points. To these articulated expanding joints expanding stretchers are mounted which, at the other end, are mounted to a ring of toggle joints of a sliding means guided on said carrying means. The expanding stretchers are dimensioned so that, contrary to the restoring forces becoming effective during expansion by deformation of umbrella stretchers and umbrella covering, they can be urged approximately to the plane of the articulated expanding joints or beyond the latter towards the bearing body into an open position providing an arrestment. The expanding stretchers, thus, correspond to articulated levers which when expanding are pivoted so as to be in the proximity of the dead center of said articulated levers or beyond the latter so as to get into a stable open position. If the sliding means is capable of being moved into an open position beyond the plane of the articulated expanding joints, the arresting can be realized in a particularly simple way by supporting the sliding means on the bearing body as abutment. The open position is automatically stabilized then. If, however, the sliding means can be moved into the plane of the articulated expanding joints or approximately just before it, the arresting can be realized by the sliding means being locked, for instance on the bearing body or even on the carrying means. Besides, an arresting may be made as additional security of an automatically stabilized open position. The arresting may be realized by positive locking and/or frictional connection (e.g. a snap-in spring latch within the sliding means which is capable of engaging a number of recesses of a connecting sleeve of the bearing body and being manually removed therefrom, a screwed connection between a screw element rotatably mounted on the sliding means and a female screw thread of the bearing body, a snap-in joint between sliding means and bearing body). The invention facilitates an axial displacement or torsion of the carrying means with respect to the bearing body and a focussing by displacement of the carrying means, with the umbrella being opened. If, in the open position, the sliding means is moved near to the bearing body, very small focal lengths are obtainable. Furthermore, very large and finely segmented umbrella-type reflectors are possible since, especially near the dead center of the articulated levers, very high expansion forces may be exerted on the umbrella stretchers by means of the sliding means. Thus, a quick assembly and disassembly of the reflector can be realized without making use of any tools or other auxiliary means. Furthermore, the structure facilitates a small weight and transport volume.

Besides the continuous focussing the element to be focussed may be also quickly exchanged without having to release or dissamble the reflector. For this purpose, the carrying means of the construction can be pulled out. It is also possible to fasten the element to be focussed to the carrying means so as to be exchangeable. At the oppsite end the carrying means may be provided with a means for the coupling and uncoupling of energy which is connected to the element to be focussed by means of the carrying means.

Preferably, the bearing body carries guiding- and/or brake elements for the tubular carrying means inside. In addition, the bearing body may be rotatably connected to a supporting means by means of a clamp. So the bearing body may be secured to a stand.

Preferably, the distance between the articulated expanding joints and the articulated joints on the bearing body is smaller than the distance between the articulated expanding stretchers and the end of the umbrella stretchers being free of any articulated joints. By this, a large effective reflector area is obtained. Furthermore, it is sufficient to only slightly move the sliding means beyond the dead center of the articulated levers, with the reflector being in the open position. In this way, the reflector can be folded again with a minimum expenditure of energy.

The umbrella covering may comprise hems outside into which the umbrella stretchers are inserted. By this, a very smooth reflector surface is obtained. At the hingeless ends of the umbrella stretchers the umbrella covering, preferably, is retained by means of sleeves being closed at their ends and, in this way, is prevented from slipping out of place towards the bearing body.

For some purposes the umbrella covering may be a metallized foil.

To facilitate opening, especially in case of very large umbrella constructions, the sliding means may be connected to a power transmission element which, at the side of the bearing body, is led outwardly. Said power transmission element may be actuated by means of a manual or motor drive. Particularly in case of a remote-controlled focussing the carrying means may be axially displaceable with respect to the bearing body by means of a drive.

The reflector may comprise any number of umbrella stretchers. For a fine segmentation at least twenty umbrella stretchers may be provided. For reasons of stability, these umbrella stretchers may be made of a carbon-fiber reinforced material and/or steel.

The carrying means for the element to be focussed may also be introduced into the front opening of the reflector after expansion and be held in a desired position towards the reflector from outside. In that case, the bearing body may be provided with a connecting sleeve for guiding the sliding means. The connecting sleeve, however, can also be omitted because the sliding means can be guided by the stretchers.

The reflector may also be designed as a large-sized weather protection, roof or suchlike adapted to be easily and quickly opened. The tubular carrying means may be completely omitted since a guidance of the sliding means by the stretcher construction is sufficient. The umbrella covering may be adapted to the respective purpose of protection.

BRIEF DESCRIPTION OF THE DRAWINGS

The invention will be detailedly described hereinafter with the aid of the accompanying drawing of an embodiment wherein.

DESCRIPTION OF THE PREFERRED EMBODIMENTS

Figure 1:
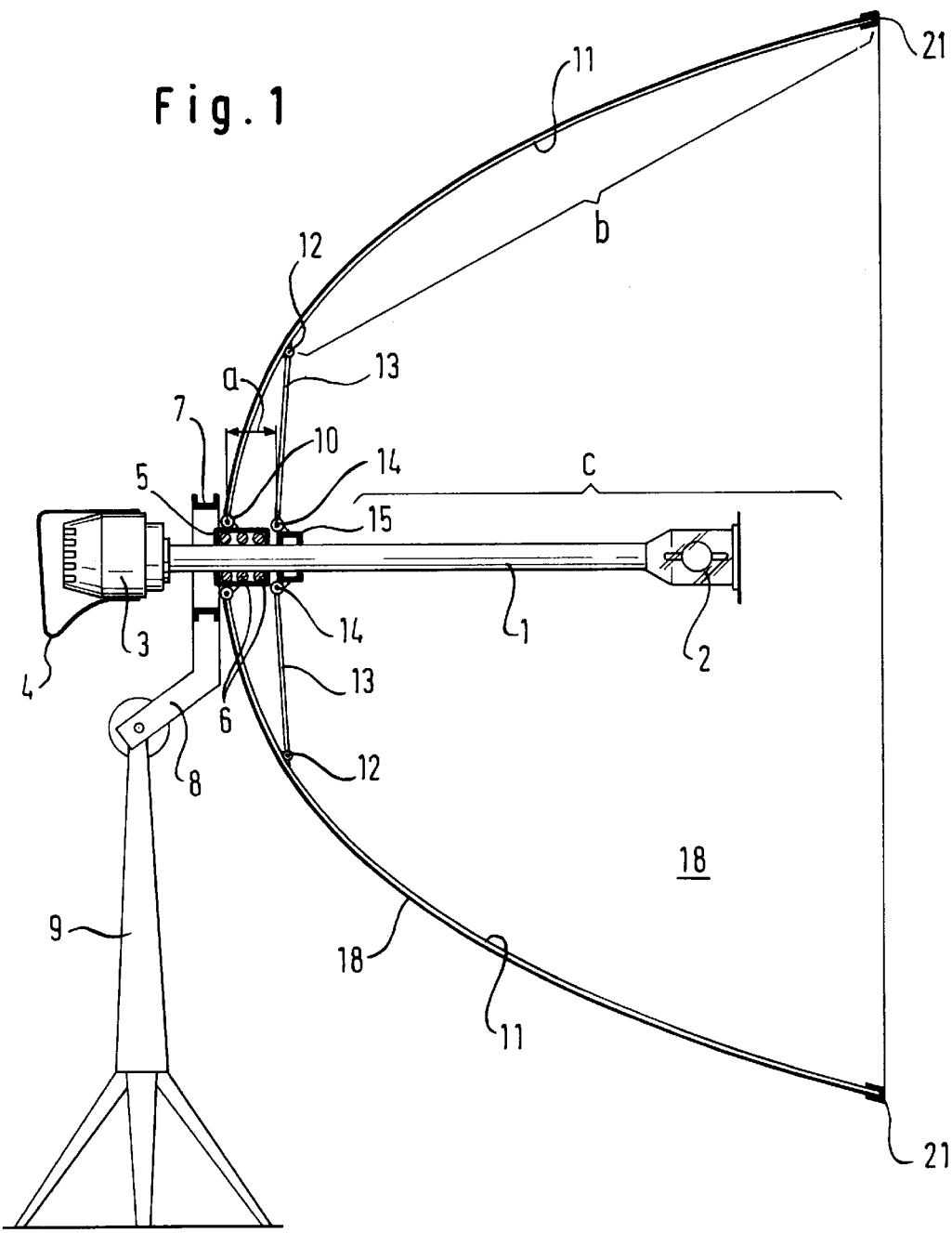
FIG. 1 shows the reflector in a longitudinal section.
Figure 2:
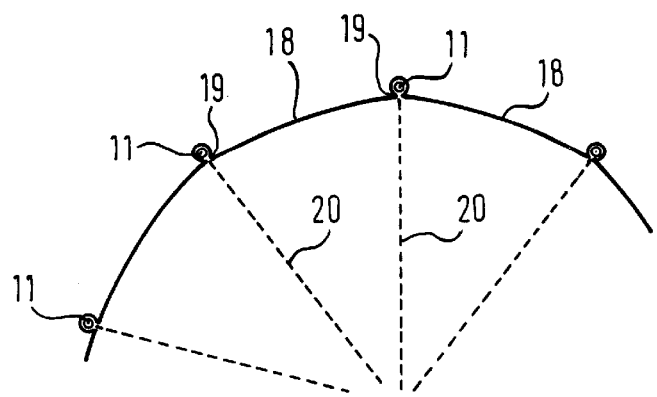
FIG. 2 shows the reflector in a partial front view.

The reflector comprises a tubular carrying means 1 which, at the one end, comprises a lamp head 2 in which at least one lamp is arranged. At the other end, the carrying means 1 is provided with an electric power supply 3 which comprises a bow-type handle 4.

The tubular carrying means 1 is held by an annular bearing body 5. Said bearing body 5 comprises Teflon rings 6 inside for guiding and fixing the carrying means 1 in the respectively set axial- and rotary position. Rolls or sliding cams may also be provided instead.

On the outer circumference the bearing body 5 is secured to a stand 9 by means of a clamp 7 and a supporting means 8. The bearing body 5 is rotatable within the clamp 7.

On the outer circumference the bearing body 5 comprises a ring of twenty four articulated joints 10. On the articulated joints 10 umbrella stretchers 11 are hinged. The umbrella stretchers 11 comprise articulated expanding joints 12 slightly spaced apart from their bearing body hinge points.

Expanding stretchers 13 are connected to the umbrella stretchers 11 by means of the articulated expanding joints 12. At the other end, the expanding stretchers 13 are mounted to toggle joints 14. Said toggle joints 14 are arranged as a ring on the outer circumference of an annular sliding means 15.

To the umbrella stretchers 11 an umbrella covering 18 is secured. It comprises hems 19 outside into which the umbrella stretchers 11 are inserted. Said hems 19 are closed inside by means of seams 20 so that the stretchers 11 do not interfere with the inner reflector surface. The umbrella covering 18 extends between the articulated expanding joints 12 and the ends of the umbrella stretchers 11 associated to the large opening of the reflector. At these ends the umbrella covering 18 is fastened to the umbrella stretchers 11 by means of sleeves 21 closed on both sides or balls including a pocket hole.

The carrying means 1 may consist of an aluminium tube. The bearing body 5, stretchers 11, 13 and sliding means 15 are made of steel, for instance. The umbrella covering may be a foil metallized inside.

The expanding stretchers 13 are dimensioned so that by actuation of the sliding means 15 they can be easily moved into the plane of the articulated expanding joints 12, whereby they overcome the resilient restoring forces of the umbrella stretchers 11 and the covering 18 like articulated levers. Besides, the construction is dimensioned so that the sliding means 15 can be slightly moved beyond this position corresponding to a dead center of the articulated levers towards the bearing body 5 so as to engage the latter. As a result of the restoring forces and the impact effect of the bearing body 5 the sliding means 15 is reliably retained in this shown position which is the open position of the reflector. Any particular clamping or arresting means are not required.

The distance a between the toggle joints 14 and the articulated joints 10 in the open position is selected to be as small as possible so that the distance b between the articulated expanding joints 12 and the hingeless ends of the umbrella stretchers 11 with the sleeves 21 is very large. By this, large reflector areas can be obtained. Thereat the shape of the reflector in this area may be influenced by the umbrella covering 18.

As a result of the small distance a between the articulated joints 10 and the toggle joints 14 in the open position reflectors with very short focal lengths can be obtained.

According to a specific feature of the construction, a very large focal length c is obtained which may extend over the whole area of the umbrella covering 18. Focussing may be realized by simply displacing the carrying means 1 with respect to the bearing body 5. Any over- or underfocussing is possible. The fastening element in the form of a clamp 6 enables the reflector to be rotated about the axis of the carrying means.

The reflector may be folded by moving the sliding means 15 away from the bearing body 5. As soon as the sliding means 15 in this direction exceeds the dead center of the toggle joints the construction is folded automatically. In this folded state the umbrella covering 18 may be easily removed from the umbrella stretchers 11 and be replaced by another covering.

I claim:

1. An umbrella reflector, comprising:
   a bearing body (5) into which a tubular carrying means (1) is inserted so that said tubular carrying means is displaceably held within said bearing body (5);
   a ring of articulated joints (10) arranged on said bearing body (5) and to which umbrella stretchers (11) are hingedly attached, a reflecting umbrella covering (18) fastened to umbrella stretchers (11);
   a sliding means (15) being displaceable on said tubular carrying means (1)
   a ring of toggle joints (14) arranged on said sliding means to which expanding stretchers (13) are mounted, the end of expanding stretchers (13) being secured to umbrella stretchers (11) by articulated expanding joints (12), said expanding stretchers (13) being dimensioned so that when opening the reflectors, said sliding means (15) is displaceable to a point past the plane of said articulated expanding joints (12), where the resilient restoring forces provide an arrestment holding the reflector in an open position, and an element (2) emitting electromagnetic or acoustic waves which is arranged at the end of said tubular carrying means (1) facing the interior of said umbrella reflector so that by displacing said tubular carrying means (1) within said bearing body (5) said element (2) is moved into different positions in relation to the opened reflector.

2. The reflector according to claim 1, wherein in the open position, said sliding means (15) is supported on said bearing body (5).

3. The reflector according to claim 1, wherein in the open position, said sliding means (15) is secured by an arrestment.

4. The reflector according to claim 1, wherein said emitting element (2) is detachably fastened to said carrying means (1).

5. The reflector according to claim 1, wherein at the end opposite to said emitting element said carrying means (1) carries a means (3) for the coupling and uncoupling of energy which is connected to said emitting element (2) by means of said carrying means (1).

6. The reflector according to claim 1, wherein said bearing body (5) carries guides and brake elements (6) inside.

7. The reflector according to claim 1, wherein said bearing body (5) is rotatably connected to a supporting means (8) by means of a clamp (7).

8. The reflector according claim 1, wherein said bearing body (5) is secured to a stand (9).

9. The reflector according claim 1, wherein the distance (a) between said articulated expanding joints (12) and said articulated joints (10) on said bearing body (5) is smaller than the distance (b) between said expanding stretchers (12) and the ends of said umbrella stretchers (11).

10. The reflector according to claim 1, wherein in the open position, said sliding means (15) is only slightly moved beyond the toggle joint dead center of said expanding stretchers (13).

11. The reflector according to claim 1, wherein said umbrella covering (18) includes hems (19) into which said umbrella stretchers (11) are inserted.

12. The reflector according to claim 1, wherein said umbrella covering (18) is secured to the ends of said umbrella stretchers (11) by means of sleeves (21).

13. The reflector according to claim 1, wherein said umbrella covering (18) is a metallized foil.

14. The reflector according claim 1, wherein said sliding means (15) is actuated with a drive by means of a power transmission element.

15. The reflector according to claim 1, wherein said carrying means (1) is axially displaceable with respect to said bearing body (5) by means of a drive.

16. The reflector according to claim 15, wherein the drive of said carrying means (1) is controllable by means of a remote control.

17. The reflector according to claim 1, wherein at least twenty umbrella stretchers (11) are provided.

18. The reflector according to claim 1, wherein said stretchers (11, 13) consist of glass-fiber reinforced plastic, carbon-fiber reinforced plastic or steel.

* * * * *